(12) United States Patent
Fatmehsari et al.

(10) Patent No.: US 11,795,109 B2
(45) Date of Patent: Oct. 24, 2023

(54) USE OF ANTIOXIDANTS AND RECYCLING AGENTS FOR IMPROVING LONG-TERM PERFORMANCE OF ASPHALTIC MATERIALS

(71) Applicant: NUtech Ventures, Lincoln, NE (US)

(72) Inventors: Hamzeh Haghshenas Fatmehsari, Lincoln, NE (US); Robert Rea, Ashland, NE (US)

(73) Assignee: NUtech Ventures, Lincoln, NE (US)

( * ) Notice: Subject to any disclaimer, the term of this patent is extended or adjusted under 35 U.S.C. 154(b) by 0 days.

(21) Appl. No.: 17/371,478

(22) Filed: Jul. 9, 2021

(65) Prior Publication Data

US 2022/0009834 A1    Jan. 13, 2022

Related U.S. Application Data

(60) Provisional application No. 63/049,850, filed on Jul. 9, 2020.

(51) Int. Cl.
*C04B 26/00* (2006.01)
*C04B 26/26* (2006.01)

(52) U.S. Cl.
CPC ............ *C04B 26/003* (2013.01); *C04B 26/26* (2013.01)

(58) Field of Classification Search
None
See application file for complete search history.

(56) References Cited

U.S. PATENT DOCUMENTS

2022/0073429 A1* 3/2022 Kulbaba ................ E01C 7/265

FOREIGN PATENT DOCUMENTS

CA        3059912 A1 * 10/2018 ............. C04B 26/26

* cited by examiner

*Primary Examiner* — John J Figueroa
(74) *Attorney, Agent, or Firm* — Leydig, Voit & Mayer, Ltd.

(57) ABSTRACT

An asphalt pavement modification system and method for improving aging resistance of asphalt pavement and a method of manufacturing reclaimed asphalt pavement. The asphalt pavement modification system and method include using one or more antioxidants and one or more recycling agents in a blended binder to provide improved short term and long term performance of the asphalt pavement. The method of manufacturing reclaimed asphalt pavement includes mixing at least one antioxidant with at least one recycling agent to form a binder that constitutes a portion of the reclaimed asphalt pavement. One of the antioxidants may be zinc diethyldithiocarbamate.

8 Claims, 7 Drawing Sheets

USE OF ANTIOXIDANTS AND RECYCLING AGENTS FOR IMPROVING LONG-TERM PERFORMANCE OF ASPHALTIC MATERIALS

CROSS-REFERENCE TO RELATED APPLICATIONS

This patent application claims the benefit of U.S. Provisional Patent Application No. 63/049,850 filed Jul. 9, 2020, which is incorporated herein by reference.

STATEMENT REGARDING FEDERALLY SPONSORED RESEARCH OR DEVELOPMENT

This invention was made with government support under SPR-P1(20) M116 awarded by the U.S. Department of Transportation, Federal Highway Administration. The government has certain rights in this invention.

BACKGROUND OF THE INVENTION

The use of recycled materials, such as reclaimed asphalt pavement (RAP), recycled asphalt shingle, glass, and ground tire rubber, may be a cost-effective and environmentally friendly production method in the asphalt paving industry. A drawback of introducing RAP into asphalt mixtures may be an increase in stiffness of RAP blended asphalt mixtures. The increase in stiffness may be due to the aged asphalt binder present in RAP. On the other hand, RAP in asphalt mixtures can result in an improvement in the rutting resistance of RAP blended mixtures.

The use of a recycling agent (RA) (i.e., rejuvenators or softening agents) has gained popularity in recent years since RAs can effectively modify the engineering properties (e.g., stiffness) of aged asphalt binder. The National Center for Asphalt Technology (NCAT) has categorized these chemical additives (i.e., RAs) into five main groups based on their origins and production process: 1) Paraffinic Oils, 2) Aromatic Extracts, 3) Naphthenic Oils, 4) Triglycerides & Fatty Acids, and 5) Tall Oils. Currently, there is general agreement that RAs can improve the cracking resistance but reduce the rutting resistance of the RAP blended mixtures. However, there are some concerns about the effect of RAs on the moisture damage resistance and the long-term performance (aging) of these additives.

BRIEF SUMMARY OF THE INVENTION

One or more embodiments of the invention may provide an asphalt pavement modification system for improving aging resistance of asphalt pavement. The system may include using one or more antioxidants and one or more recycling agents in a blended binder to provide improved short term and long term performance of the asphalt pavement.

In addition, one or more other embodiments of the invention may provide an asphalt pavement modification method for improving aging resistance of asphalt pavement. The asphalt pavement modification method may include combining one or more antioxidants and one or more recycling agents into a blended binder to provide improved short term and long term performance of the asphalt pavement.

Further, one or more additional embodiments of the invention may provide a method of manufacturing reclaimed asphalt pavement. The method of manufacturing reclaimed asphalt pavement may include mixing at least one antioxidant with at least one recycling agent to form a binder that constitutes a portion of the reclaimed asphalt pavement.

BRIEF DESCRIPTION OF THE SEVERAL VIEWS OF THE DRAWINGS

FIG. 1A (Ic=o), FIG. 1B (Is=o), and FIG. 1C show reduction in FT-IR indices with increasing antioxidant concentration in accordance with the disclosure.

DESCRIPTION OF THE INVENTION

Relative to the present disclosure, the long-term performance of chemically different RAs was evaluated. Other additives may be used to modify asphalt binders and retard age hardening. These modifiers are called antioxidants or anti-aging additives. When antioxidants are added to asphalt binder, they control oxidation by trapping or scavenging free radicals, which are responsible for initiating and/or propagating oxidation. Rheological (e.g., dynamic shear rheometer (DSR) and bending beam rheometer (BBR)) and mechanical (e.g., resilient modulus, indirect tensile strength, creep, and fatigue resistance) tests have been conducted to study the effect of antioxidant additives on asphalt binder and mixture performance. An antioxidant additive produced by combining aldehyde, thioester, and a catalyst was investigated for its effect on the performance of a binder. This antioxidant additive not only increases the dynamic shear modulus, $G^*$, and boosts the permanent deformation resistance of the asphalt mixture, the antioxidant additive also may enhance the low temperature cracking resistance after both short-term and long-term oven aging conditioning.

Moreover, the effect of agriculturally derived lignin containing 3-12% ethanol coproducts was examined using DSR and BBR. The agriculturally derived lignin might be used as an antioxidant additive to retard the oxidation process that occurs for the binder/mixture with short- and long-term aging.

The idea of modifying the properties of aged binders using recycling agents (RAs) and providing long-term age resistance through the addition of antioxidants seems to be a viable solution. Based on the initial experimental test results that we obtained from our research, the combination of these technologies was proved effective and can bring significant pavement life cycle cost savings, provide longer-lasting and more sustainable roadway pavements.

The present disclosure, therefore, relates to aging resistance of asphalt binders through the use of zinc diethyldithiocarbamate (ZnDEC), an antioxidant. The disclosure provides a system and method by which to mitigate aging. Aging can significantly reduce the durability of binders used in asphalt pavements and can consequently impose long-term maintenance cost to the owners. Antioxidants are additives that can be used to hinder oxidation and hardening of petroleum asphalt binders. In the present disclosure, the effect of ZnDEC as an antioxidant on chemical and rheological features of the binder were evaluated and monitored during laboratory aging processes. The results indicated that not only can ZnDEC retard the aging process, but ZnDEC may also improve the low- and mid-temperature cracking resistance without negatively affecting the rutting performance of the binder. While precise values and ranges for low, mid, and high temperature may vary based on environment and desired outcomes, the systems and methods described herein may be applied.

Aging can significantly reduce the durability of binders used in asphalt pavements and can consequently impose long-term maintenance costs to the owners. Antioxidants for use in asphalt binders may be effective in retarding and controlling the oxidation (aging) process of asphalt binders by trapping or scavenging free radicals that exist in the binder, which are assumed to be responsible for the aging of asphalt binders. Antioxidants can be categorized, in accordance with their acting mechanisms, in four types: primary antioxidants, secondary antioxidants, metal chelators, and light stabilizers.

An ideal antioxidant would improve high-, mid- and low-temperature properties of the binder/mixtures at different aging levels. While some antioxidants may work satisfactorily at low temperatures; these antioxidants may not provide benefits to asphalt binders and mixtures at high temperatures. In other words, discovering antioxidants that can improve the low- and mid-temperatures properties (crack resistant) without deteriorating high-temperatures properties (rut resistant), will be paramount in designing long-term sustainable pavements.

Other past research mainly focused on rheological and mechanical aspects of binders/mixtures. Although these aspects are important, one must understand and evaluate antiaging mechanisms and their effectiveness under long-term aging conditions. In addition, monitoring the chemical and structural changes that occur in the presence of such antioxidants may provide more information regarding the influence of antioxidants in restoring the long-term properties of asphalt binders/mixtures.

In accordance with the disclosure, the effects of one material, ZnDEC, as an antioxidant, on the chemical and rheological properties of asphalt binder aged under various aging conditions are presented. Similar chemical classes may exhibit the same effect on asphalt binder aging. The research utilized a control binder (C) that is modified with different levels of ZnDEC. The control binder and the ZnDEC-modified binder were laboratory aged to simulate aging processes that a binder may experience in the field. The chemical properties of binders were then characterized using Fourier Transform Infrared (FT-IR) spectroscopy. In addition, Dynamic Shear Rheometer (DSR) and Bending Beam Rheometer (BBR) tests were employed to determine the high-, mid-, and low-temperature rheological properties of the binders.

In the study, ZnDEC was used. ZnDEC, is widely used as an activator and accelerator in natural/butyl rubber and as a stabilizer in cement. The general information of this additive is presented in Table 1:

TABLE 1

Properties of ZnDEC used in this study

| Properties | Description/value |
|---|---|
| Linear formula | $[(C_2H_5)_2NCS_2]_2Zn$ |
| Structure | (chemical structure diagram) |
| Appearance (color/form) | White to off-white/crystal to powder |
| Assay (%) | 99% |
| Melting point (° C.) | 178-181 |
| Flash point (° C.) | 204 |
| Specific gravity | 1.48 |

In this study, 2% and 4% (by weight) of ZnDEC were added to the control binder (C) and identified as CZ2 and CZ4, respectively. Depending on the desired effectiveness and the environmental conditions of the asphalt, the amount of ZnDEC added may vary. A higher temperature can also be used, and also a longer or shorter mixing time.

The experimental methods will now be described regarding using a rolling thin film oven (RTFO) and a pressure aging vessel (PAV). The short-term aging (using RTFO) and long-term aging (using PAV) were applied to the binders according to the American Society for Testing and Materials (ASTM) standards ASTM-D2872 (2012) and ASTM-D6521 (2013), respectively. In order to examine the long-term performance of ZnDEC during the aging process, after short-term aging, the duration of long-term aging was varied (20 (1PAV), 40 (2PAVs), and 80 (4PAVs) hours (hrs)) at 100 degrees Celsius (deg C.) under a pressure of 2.1 Megapascals (MPa).

Permanent Deformation (Rutting) Resistance

To evaluate permanent deformation (rutting) resistance of the binders, Dynamic Shear Rheometer (DSR) was used. The dynamic shear modulus ($G^*$) and phase angle ($\delta$) of binders were recorded at each temperature using standard 25 millimeter (mm) diameter plates at a 1 mm testing gap. The $G^*/\sin \delta$ of binders was measured, and the temperature at which the value of $G^*/\sin \delta$ was 1.00 kilopascals (kPa) was considered as the critical high temperature.

Low-Temperature Cracking Resistance

Using a Bending Beam Rheometer (BBR), low-temperature cracking resistance was tested. A BBR test (American Association of State Highway and Transportation Officials standard AASHTO-T313 2012) was carried out on the binders aged through RTFO and PAV procedures. The relaxation constant (m) and flexural creep stiffness (S) at 60 seconds of loading were measured and used for the estimation of low-temperature cracking resistance of the binders.

Mid-Temperature Cracking Resistance

Using a dynamic shear rheometer (DSR), mid-temperature cracking resistance was also tested. A DSR was used to record the dynamic shear modulus ($G^*$) and phase angle ($\delta$) of each binder. Based on the Glover-Rowe (G-R) concept, if the value of $G^* \times (\cos \delta)^2/\sin \delta$ of a binder lands in the zone above the 600 kPa curve, the binder may experience severe damage. On the other hand, a binder with G-R value ($G^* \times (\cos \delta)^2/\sin \delta$) below the 180 kPa curve is healthy and no crack is initiated in the binder.

Fourier Transform Infrared Spectroscopy

A Nicolet Avatar 380 Fourier transform infrared (FT-IR) spectrometer operated in attenuated total reflection (ATR) mode was used for recording FT-IR spectra. OMNIC 8.1 software was applied to estimate the areas under the peaks. The carbonyl index (Ic=o) and sulfoxide index (Is=o) were considered as the criteria to quantify the extent of aging in the asphalt binder as described:

$Ic\text{=}o\text{=}$(Area under Band 1700 $cm^{-1}$ peak)/($\Sigma$ Area under FT-IR Spectrum)

$Is\text{=}o\text{=}$(Area under Band 1032 $cm^{-1}$ peak)/($\Sigma$ Area under FT-IR Spectrum)

Figure 1A:
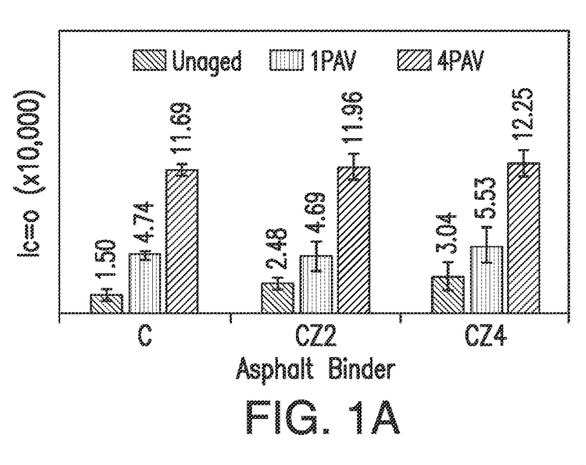
FIGS. 1A-1C are FT-IR test results.
Figure 1B:
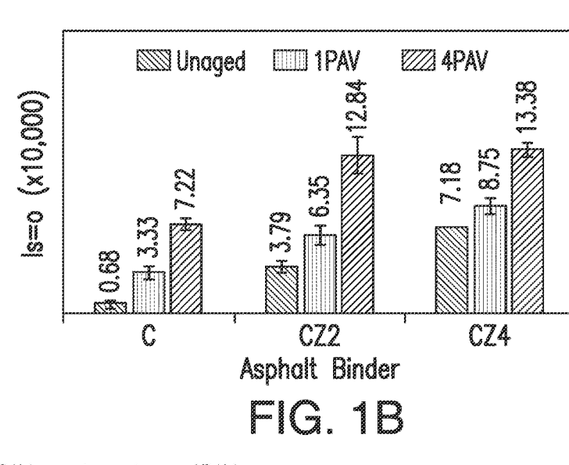

The results and discussions of the testing will now be described. Regarding chemical characterization, aging results are shown by an increase in both indices of all binders, as shown in FIGS. 1A and 1B. The addition of ZnDEC into the binder led to a greater increase in the level of carbonyl and sulfoxide indices, which might be due to the presence of sulfur and carbon in the structure of ZnDEC. The results also show that after 20 and 80 hrs of long-term aging (i.e., 1 PAV and 4 PAV), the carbonyl index of the modified binders is similar to that of the control binder (C) aged under the same conditions.

Figure 1C:
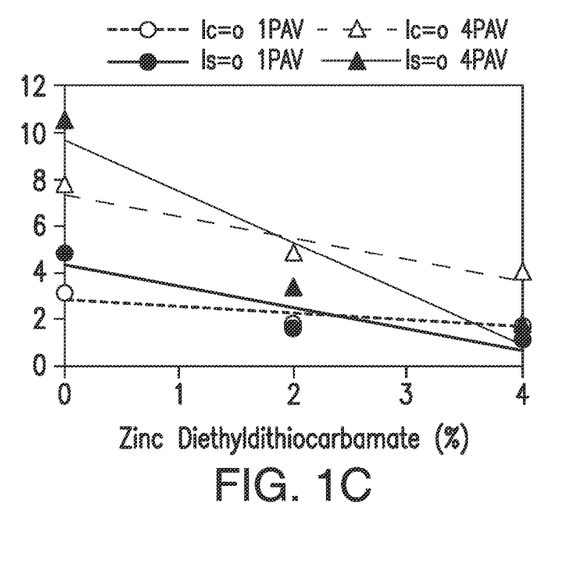

It is worth noting that, although the carbonyl and sulfoxide indices of modified binders are higher than that of C binder under different aging conditions, there is an interesting trend. The control binder (C) experiences 3.2 and 7.8 times increase in carbonyl index after 1PAV and 4PAV, respectively, compared to the unaged condition, while the modified binder with 4% ZnDEC exhibits only 1.8 and 4 times increase in the carbonyl index under the same aging conditions. In FIG. 1C, the relative reductions of the indices (with respect to that of an un-aged condition) are presented after 1 PAV and 4 PAV.

The findings also show the sulfoxide index is similar to the carbonyl index. For example, the modified binder with 4% ZnDEC shows 1.2 and 1.9 times increase in the sulfoxide index after 1 PAV and 4 PAV, respectively, compared to the un-aged condition, while these values jump up 4.9 and 10.6 times in case of C binder. These observations indicate that ZnDEC, in both dosages (i.e., 2 and 4%), improves aging resistance of the binder and 4% ZnDEC reduces the aging rate by 75 to 82% (FIG. 1C). These results were positive to the researchers, but unexpected.

Figure 2A:
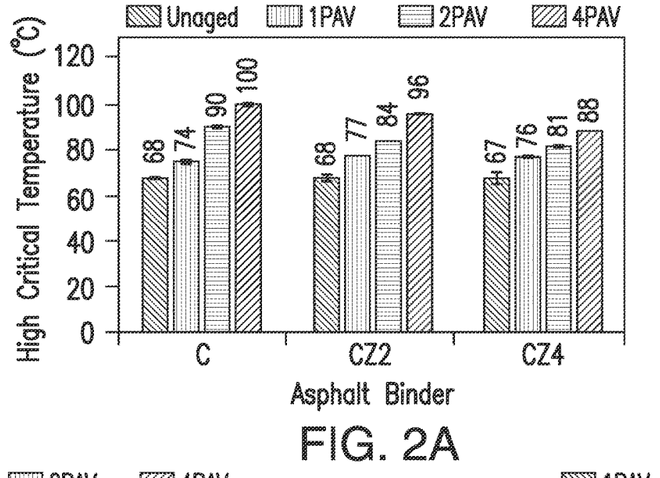
FIGS. 2A-2C illustrate rheological properties of the unaged and aged binders in accordance with the disclosure.

Regarding rheological properties, in one or more embodiments of the present disclosure, the antioxidants may improve high-, mid- and low-temperature properties of the binder; i.e., such improvements should not be at the expense of weakening other properties. FIG. 2A shows that the addition of ZnDEC has no significant effect on the rutting resistance of the virgin binder. In addition, a comparison between critical high temperatures of the C binder and modified one (CZ4) indicates that this antioxidant can control the oxidation process since the C binder shows a large stiffening effect of 32 deg C. increase in critical high temperature (from 68 to 100 deg C.) after 80 hrs long-term aging, while the CZ4 critical high temperature increase (stiffening) is only 21 deg C., which is 35% less than that with C binder. This indicates that ZnDEC can protect the binder from the oxidation (aging) and hardening process.

Figure 2B:
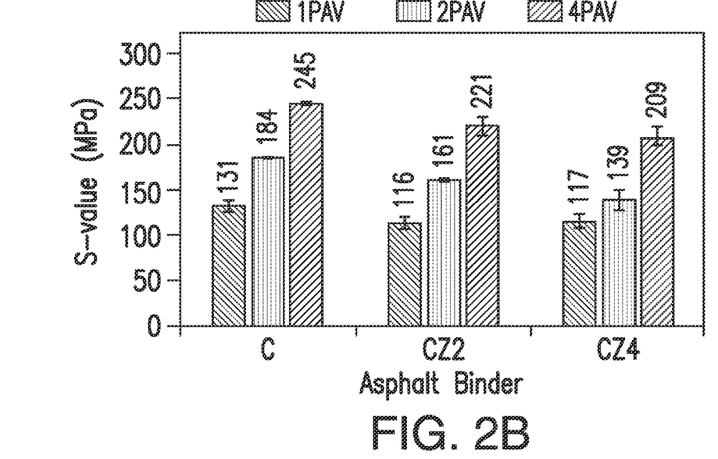
Figure 2C:
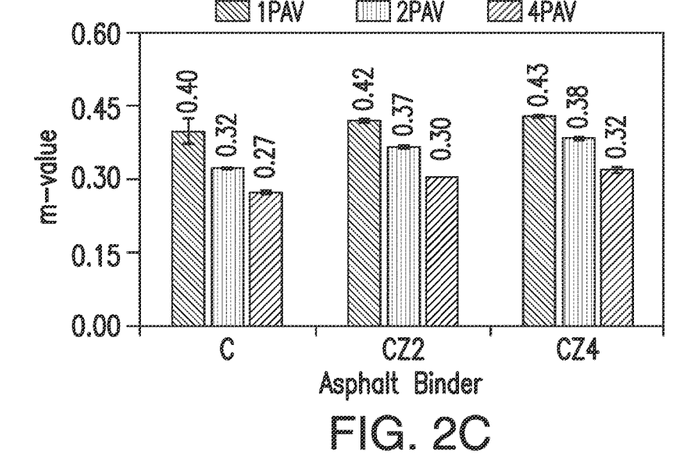

Similarly, the modified binders exhibit better low-temperature performance compared to the virgin binder. According to the results presented in FIGS. 2B and 2C, all binders can pass the S-value criterion (S≤300 MPa) even after 80 hrs long-term aging. However, the C binder barely meets the m-value criterion (m≥0.300) after 40 hrs aging. These observations confirm that ZnDEC can improve the low temperature cracking resistance of the C binder.

In summary, the rheological behaviors of the modified binders are consistent with the chemical characteristics of the modified binders. That is, the lower increase in the values of carbonyl and sulfoxide indices of the modified binders (CZ2 and CZ4), compared to the C binder, also yields better rheological performance in the high-, mid-, and low-temperature ranges with the use of ZnDEC.

Figure 3:
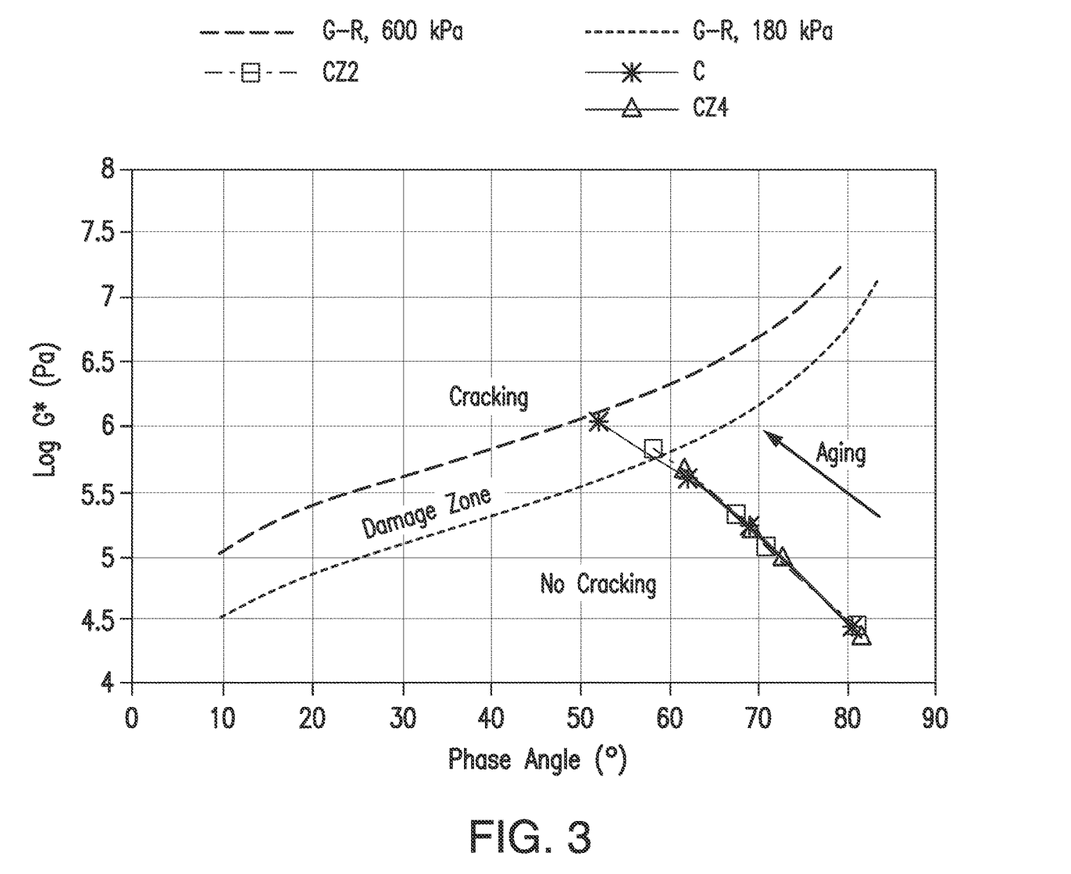
FIG. 3 is a graphical representation of Glover-Rowe test results in accordance with the disclosure.

To determine the cracking resistance of the asphalt binder at mid-temperature, the Glover-Rowe (G-R) test and analysis are employed. According to the results presented in FIG. 3, the control binder (C) can satisfy the performance criteria up to 56 hrs, while the CZ2 and CZ4 can work satisfactorily up to 73 and 82 hrs respectively, since their corresponding G-R curves do not intersect with the damage onset (G-R value=180 kPa) and severe damage (G-R value=600 kPa) curves. Research literature supports the applicability of conventional 1PAV (20 hr aging) test in the simulation of real (field) conditions of the asphalt binder up to 10 years. However, the average expected service life of the flexible pavements should be longer, more appropriately 20 years. That is why some researchers believe that a 2 PAV test (40 hrs aging) might simulate the field aging more accurately and is currently becoming the research standard testing protocol for asphalt binders, and asphalt binders modified with different additives.

Based on this approach, the C binder modified by 4% ZnDEC (CZ4) may lengthen the pavement life for an extended amount of time, possibly another 20 years (total 40 years) since after 80 hrs aging, the test results suggest that the CZ4 binder still exhibits acceptable behavior. In other words, the G-R parameter of CZ4 falls below the aging onset curve after 4PAV test indicating continued crack resistance in this binder. This modification by ZnDEC may provide significant improvement in pavement performance.

In this study, ZnDEC was examined as an antioxidant in an effort to reduce the aging effects on an asphalt binder. The control binder (C) was modified with different concentrations of the ZnDEC (2 and 4% for these tests, but a wider range can also be used) and then the binders were aged through RTFO and different PAV aging times (20, 40, and 80 hrs). The chemical and rheological properties of the modified binders were measured using different testing techniques. The chemical test results showed that the addition of ZnDEC slowed the increasing trend of the carbonyl and sulfoxide indices compared to the control binder. In addition, the rheological characterization (BBR and DSR) revealed that ZnDEC improves the low- and mid-temperature cracking resistance without any significant effect on the rutting performance of the binder (according to critical high temperature). Most importantly, the G-R results indicate that the binder modified by 4% of ZnDEC may double the service life of the binder, which was a quite unexpected result.

The feasibility of using antioxidants (e.g., zinc diethyldithiocarbamate, N-Isopropyl-N'-phenyl-p-phenylenediamine, Vitamin E, and any other antioxidants) and the recycling agents (e.g., paraffinic oils, aromatic extracts, and tall oils) used for restoring reclaimed asphalt pavement (RAP) is an emerging technology for use of antioxidants in combinations with binders and additives to manufacture high performance binders that can withstand the effects of long term aging (extended aging, 2 PAVs). In a subsequent study in accordance with the disclosure, the synergy between different types of recycling agents (paraffinic oil (P), triglyceride and fatty acid (TF), and tall oil (T)) and ZnDEC as an antioxidant is examined using rheological characterization at high, ambient, and sub-zero temperature. The study results showed that efficacy of recycling agents was improved with the addition of antioxidant, however, the efficacy of antioxidant varied depending on the recycling agents used. The latter was attributed to susceptibility of recycling agents to oxidation as well as extent of synergy between recycling agents such as ZnDEC.

In this subsequent study, 4% (by weight) of ZnDEC was selected as an antioxidant, and added to the asphalt binder. The binder and additives (i.e., recycling agents and ZnDEC) were mixed at a shear rate of 2000 revolutions per minute (rpm) using a high shear mixer. Mixing was continued for 15 min at 178 deg C., which is the melting point of ZnDEC. The properties of ZnDEC are provided above in Table 1. Performance Grade Asphalt PG 64-22 was used in this study as a virgin binder. The physiochemical properties of this binder are shown in Table 2:

| Test | PG 64-22 |
| --- | --- |
| Ductility at 25° C. (cm) | >100 |
| Penetration at 25° C., 100 g (dmm) | 70 |
| Specific gravity at 25° C. | 1.031 |
| Viscosity at 135° C. (cSt) | 432 |
| Carbon, Hydrogen, Nitrogen, Oxygen, Sulfur Content, (wt. %) | 83.3, 10.5, 0.8, 0.5, 5.3 |
| Asphaltenes, Resins, Aromatics, Saturates (wt. %) | 13.9, 25.8, 55.3, 5.0 |

The penetration is expressed in units of decimillimeters (dmm). The PG 64-22 was also conditioned with short-term aging (Rolling Thin Film Oven (RTFO), ASTM-D2872) followed by long-term aging (Pressure Aging Vessel (PAV), ASTM-D6521) for 40 hrs at 100 deg C. under a pressure of 2.1 MPa, in order to simulate the aging status of reclaimed asphalt binder found in field-aged samples. The grade of aged binder obtained through this protocol was PG 90-14.

The control binder in this study, denoted as C, consisted of 35% virgin binder (PG 64-22) and 65% lab-made RAP binder (PG 90-14). The C binder was modified with different recycling agents to recover its properties to meet the PG 64-28 requirements and then antioxidant was introduced to blends. Each asphalt binder was exposed to short- and long-term aging to evaluate durability of modified asphalt binder. In this study, we incorporated 20, 40, and 100 hrs of aging representing 1, 2, and 5 PAVs, respectively. The latter scenario (5 PAVs) was used to determine the point of severe cracking using the Glover-Rowe (G-R) diagram. Table 3 presents the eight blended binders used in this study:

TABLE 3

The eight blended binders used is this study.

| Binder Description | Binder ID |
| --- | --- |
| 35% PG 64-22 + 65% lab-made RAP binder | C |
| 31% PG 64-22 + 65% lab-made RAP binder + 4% ZnDEC | CZ |
| 23% PG 64-22 + 65% lab-made RAP binder + 12% P | CP |
| 19% PG 64-22 + 65% lab-made RAP binder + 12% P + 4% ZnDEC | CPZ |
| 29% PG 64-22 + 65% lab-made RAP binder + 6% TF | CTF |
| 25% PG 64-22 + 65% lab-made RAP binder + 6% TF + 4% ZnDEC | CTFZ |
| 27% PG 64-22 + 65% lab-made RAP binder + 8% T | CT |
| 23% PG 64-22 + 65% lab-made RAP binder + 8% T + 4% ZnDEC | CTZ |

Experimental Methods

The experimental Methods will now be discussed. With respect to laboratory aging conditions, two widely used protocols to simulate short- and long-term field aging, in the laboratory, are RTFO and PAV, respectively. In this study all binders (Table 3) were short-term aged according to ASTM135 D2872 followed by exposing them to long-term aging ranging from 20 to 100 hrs. The temperature and pressure use to expose long-term aging were 100 deg C. and 2.1 MPa, respectively following ASTM-D6521.

The DSR is used to evaluate the rutting resistance of the binders. The dynamic shear modulus (G*) and phase angle ($\delta$) of binders were recorded at temperatures ranging from 58 to 94 deg C. using a 25 mm parallel-plate setup at a 1 mm binder film thickness. The G*/sin $\delta$ of binders is measured and the temperature at which the value of G*/sin $\delta$ is 1.00 kPa was considered as the critical high-temperature PG following ASTM D6373-21. In addition, rheometry was used to calculate Glover-Rowe (G-R) parameters. To do so, an oscillation rheometry test was performed on a binder film with 2 mm thick and 8-mm diameter at 45 deg C. and 10 radians/second (rad/s). The dynamic shear modulus (G*) and phase angle ($\delta$) were recorded and used to determine the G-R parameter using equation (1):

$$G-R \text{ Parameter} = G^* \times \frac{(\cos \delta)^2}{\sin \delta} \qquad \text{Equation (1)}$$

Two curves are developed based on the G-R concept. In the Black Space diagram shown in FIG. 3, according to the Glover-Rowe thresholds binders with G-R value less than 180 kPa should not experience cracking, while binders with G-R value above 600 kPa will have severe cracking distresses. Binders with a G-R value between 180 kPa and 600 kPa are in the crack damage zone area of the diagram, this indicates that the binder may experience various degrees of cracking.

The BBR test is conducted to determine the cracking resistance of binders at low-temperature according to AASHTO-T313 on the original and aged binders prepared through RTFO and PAV procedures as explained earlier. A subzero temperature (−18° C.) was selected to evaluate low temperature properties of binders. The relaxation constant (m) and flexural creep stiffness (S) at 60 seconds of loading are also determined and used for the estimation of low-temperature cracking resistance of the binders.

Figure 4:
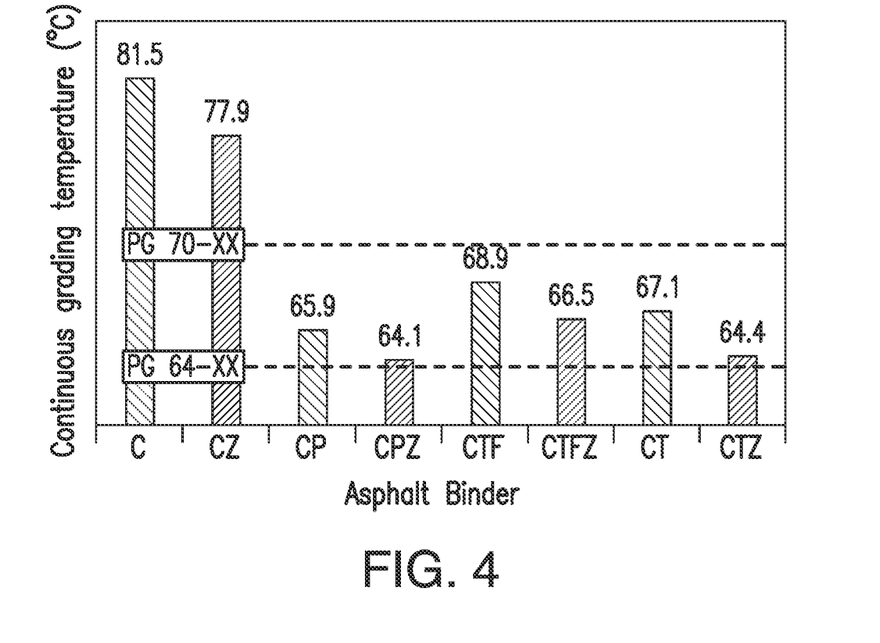
FIG. 4 is a graphical representation of high temperature properties of binders under continuous grading performance in accordance with the disclosure.

According to the results presented in FIG. 4, addition of recycling agents softens the C binder leading to a reduction of high-temperature grade from 81.5° C. in C binder to 64° C.-70° C. in modified asphalt binder. Introducing antioxidant to the blends slightly decreases high-temperature PG, however the blends still satisfy the requirements for the high-temperature PG 64° C.

Figure 5A:
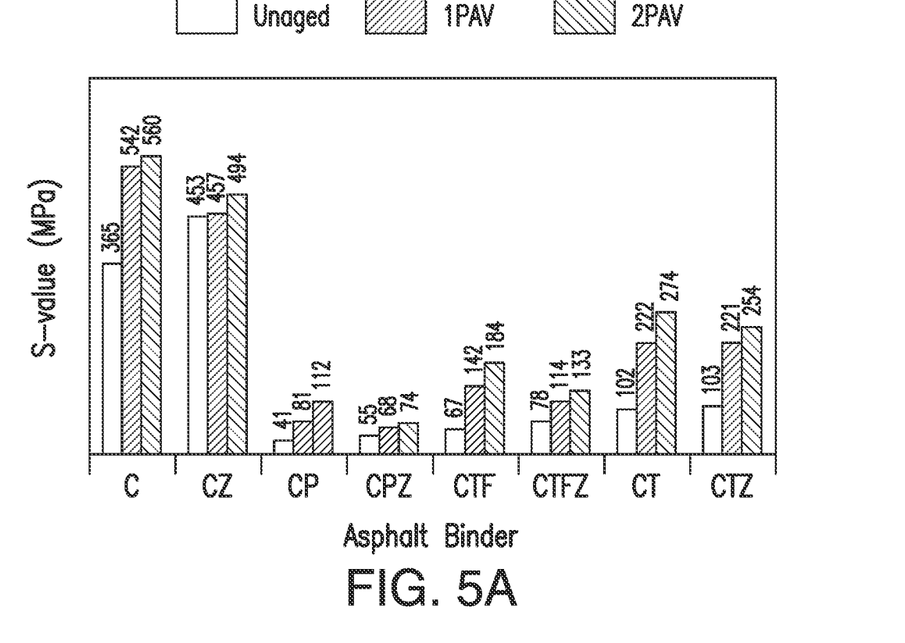
FIGS. 5A and 5B illustrate low temperature properties of binders: (a) flexural creep stiffness (S-value), (b) increase in S-value after laboratory aging conditions in accordance with the disclosure.
Figure 5B:
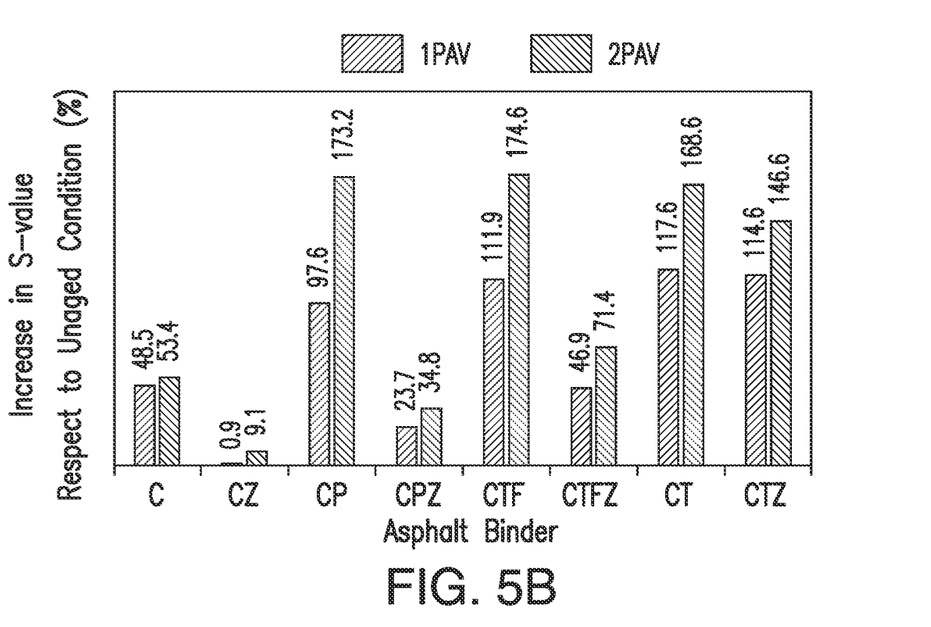

The properties of each specimen at low temperature is characterized using the BBR test at −18 deg C. Overall, FIGS. 5A and 5B show that the flexural creep stiffness (S-value) of the aged binders is improved with addition of recycling agents. This improvement is magnified when antioxidant (ZnDEC) is introduced to the modified asphalt binders with recycling agents. FIG. 5A shows that specimens containing antioxidant pass the flexural creep stiffness criterion (S-value≤300 MPa) even after 40 hrs aging. FIG. 5B exhibits that the change in flexural creep stiffness in specimens containing the antioxidant is less than those without it. For example, CP binder experiences 97.6 and 173.2% increases in the flexural creep stiffness after 1 PAV and 2 PAVs, respectively, while CPZ (CP containing antioxidant) shows only 23.7 and 34.8% increases in the flexural creep stiffness. This result may indicate that antioxidant retarded the aging process.

Figure 6A:
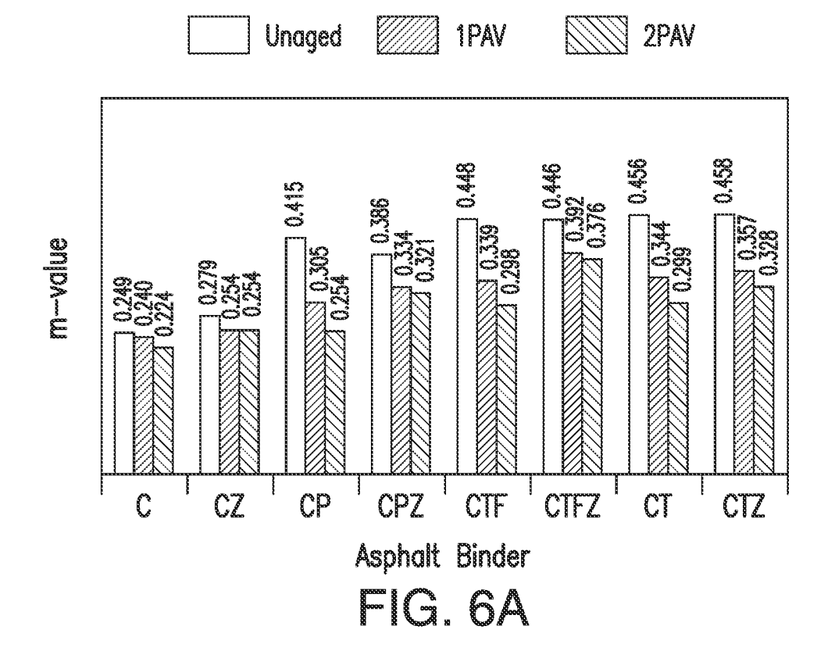
FIGS. 6A and 6B illustrate low temperature properties of binders: (a) stress relaxation constant (m-value), (b) decreasing rate of m-value after laboratory aging conditions in accordance with the disclosure.
Figure 6B:
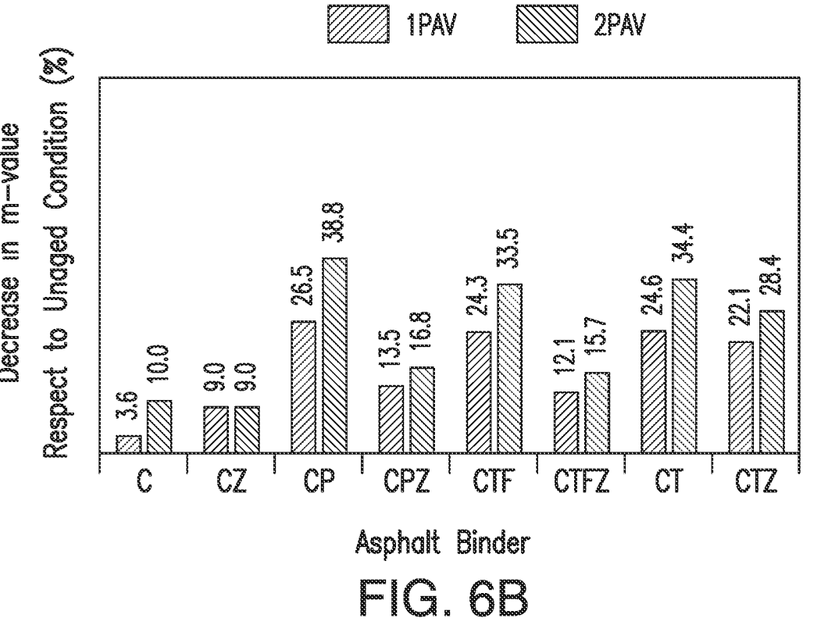

The results presented in FIG. 6A shows all binders containing antioxidant pass the stress relaxation constant criterion (m-value≥0.300) even after 2 PAVs. However, none of the samples without antioxidants pass the latter criterion indicating recycling agents are highly susceptible to oxidation and needs some type of protection such as an antioxidant to remain effective. For instance, stress relaxation constant of CTF binder decreases by 24.3% and 33.5% after 1PAV and 2PAVs respectively, while CTFZ (CTF containing antioxidant) shows only 12.1 and 15.7% decrease in this parameter (FIG. 6B). The latter improvement is even more evident in case of paraffinic recycling agent (P) for which the decreasing rate of stress relaxation constant increases to be much higher in absence of antioxidant. The results presented in FIG. 6B indicate that CP binder experiences 26.5 and 38.8% decreases in the stress relaxation constant after 1PAV and 2PAVs, respectively. While after introducing antioxidant to CP binder (denoted by CPZ), it shows only 13.5 and 16.8% decreases. These observations confirm that the combination of recycling agents with antioxidant significantly enhances the long-term performance of modified asphalt binders. This result can be attributed to protecting recycling agents against oxidation through the use of antioxidants.

Figure 7:
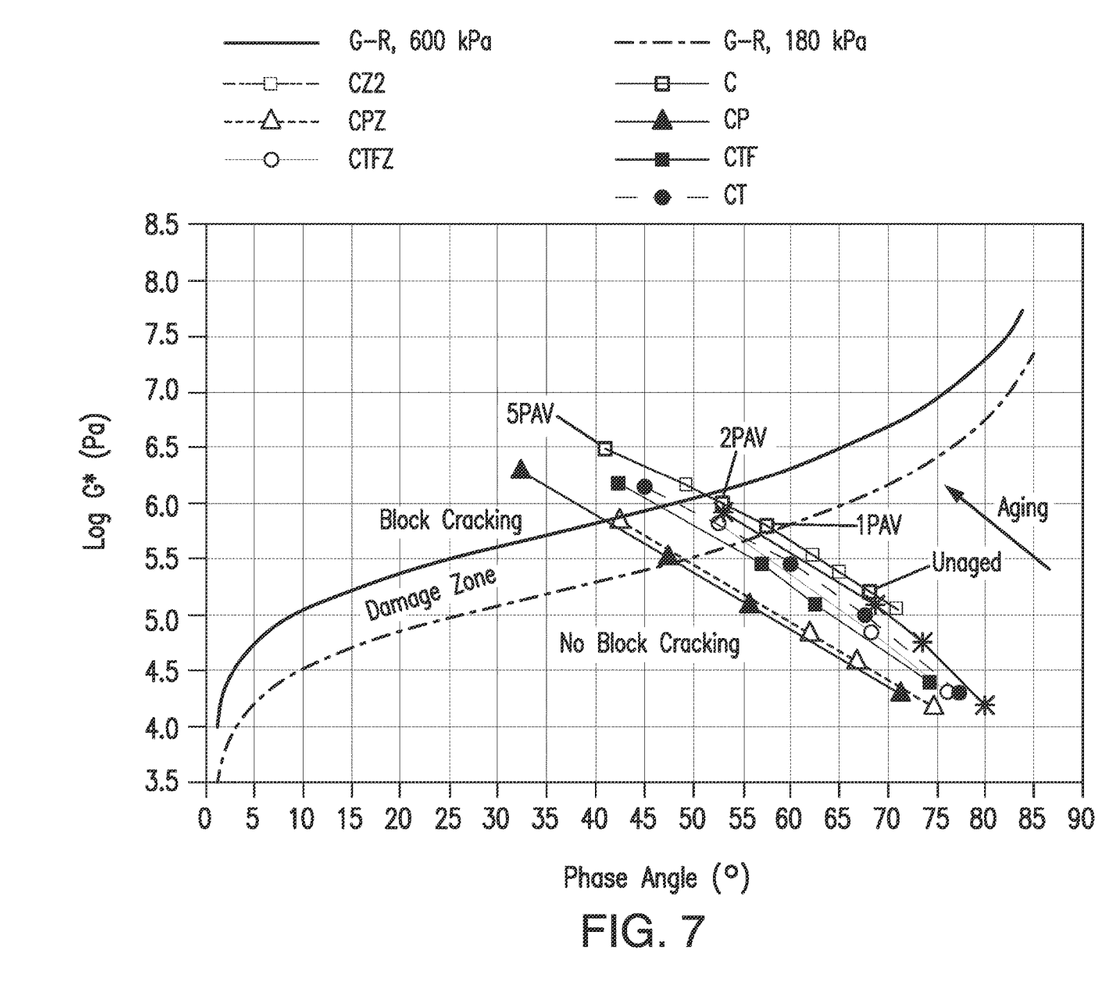
FIG. 7 illustrates mid temperature properties of binders: Glover-Rowe test results, in accordance with the disclosure.

The cracking resistance of binder at mid-temperature is elaborated in FIG. 7. As expected, all of the recycling agents decrease stiffness (their trend lines lie below the C binder trend line) so that at the unaged condition P, TF, and T have much lower dynamic shear modulus G* and higher phase angle 6 values than the C binder. However, the rate of aging for all of these samples containing recycling agent is faster than C binder. This difference indicates that even if the recycling agents all led to short-term softening, their effect did not sustain in long-term as recycling agents themselves became oxidized. A comparison between C and CZ data shows that the rate of change in the abovementioned values (G* and higher phase angle) as aging progress were continuously lower that those samples not having antioxidant. The fact that C and CZ lie on the same Log G* as a function of phase angle reveals that the impact of aging has not degraded the CZ binder as much as it degraded the C binder. In other words, the CZ binder has been aged at a lower rate compared to C. In addition, the results presented in FIG. 7 show that the performance of CP binder associated with aging is not satisfactory, since the G-R parameter of this binder falls into the damage zone area even before 2 PAVs. However, introducing antioxidant shifted the crack initiation to be occur well after 40 hrs (2 PAVs).

Presence of the Antioxidants Reduced the Rate of Aging in Modified Samples

The efficacy of the antioxidant depends highly on the recycling agent. Overall, the study results showed that addition of antioxidant delayed the crack initiation to longer aging time for all binders.

To measure aging time to induce onset (initial) and severe cracking, the phase angle of each binder at the intersection of its trend line with G-R curves (G-R value=180 kPa and 600 kPa) is estimated using FIG. 7. Also, the phase angles obtained from the G-R test for each binder in unaged, 1 PAV, 2 PAVs, and 5 PAVs are plotted versus the aging times (0, 20, 40, and 100 hrs) and the equation of a line of best fit through data points is found. Using phase angles at the intersections and the obtained equations, aging time to induce onset (initial) and severe cracking are determined and summarized in Table 3:

TABLE 3

Measured Aging time to induce onset (initial) and severe cracking.

| Binder ID | Onset Damage (hr), G-R = 180 kPa | Severe Damage (hr), G-R = 600 kPa |
|---|---|---|
| C | 27 | 52 |
| CZ | 61 | 91 |
| CP | 38 | 70 |
| CPZ | 78 | 100 |
| CTF | 43 | 84 |
| CTFZ | 91 | 116 |
| CT | 49 | 90 |
| CTZ | 83 | 103 |

The results reveal that the antioxidant can significantly improve the aging related performance of the binders in mid-temperature. For instance, in CP binder, the crack is initiated after 38 hrs and this binder experiences severe cracking conditions after 70 hrs. However, addition of antioxidant to the CP binder (labelled as CPZ) increased the crack initiation and severe cracking time to 78 and 100 hrs, respectively. The same trend can be observed for other asphalt binders.

In this subsequent study, therefore, the effect of three different recycling agents (P: derived from petroleum, TF: derived from plant/seed oils, and T: derived from trees) and an antioxidant (ZnDEC) on durability modified asphalt binder were evaluated. Based on the test results and analyses the following conclusions were drawn: 1) introduction of recycling agents softened the binder and this effect was slightly magnified by introduction of the antioxidant; 2) presence of the antioxidant slowed down the decrease of binders' m-values (stress relaxation constant) and the increase of binders' S-values (flexural creep stiffness) during oxidation aging. This indicates that antioxidant was effective in delaying aging of the recycling agents. Further, the effectiveness of antioxidant in delaying aging varied depending on the type of recycling agent.

In general, the observations are that the efficacy of recycling agents was improved with the addition of antioxidant, that the efficacy of antioxidant varied depending on the recycling agents used, and that the antioxidant slightly magnified the softening effect of recycling agents.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An asphalt pavement modification method for improving aging resistance of asphalt pavement, comprising combining one or more antioxidants and one or more recycling agents into a blended binder to provide improved short term and long term performance of the asphalt pavement, the one or more antioxidants comprising zinc diethyldithiocarbamate.

2. The method of claim 1, wherein the binder is combined into a mixture comprising reclaimed asphalt pavement or recycled material.

3. The method of claim 1, wherein the one or more recycling agents is selected from a group consisting of paraffinic oils, aromatic extracts, tall oils, triglycerides/fatty acids, and naphthenic oils.

4. The method of claim 1, wherein the binder can provide longer service life of the asphalt pavement than binders that are not modified through system.

5. The method of claim 4, wherein the binder can provide at least two times more service life of the asphalt pavement than binders that are not modified through system.

6. The method of claim 1, wherein the binder comprises between 2% and 4% of zinc diethyldithiocarbamate by weight.

7. A method of manufacturing reclaimed asphalt pavement, comprising mixing at least one antioxidant with at least one recycling agent to form a binder that constitutes a portion of the reclaimed asphalt pavement, the at least one antioxidant comprising zinc diethyldithiocarbamate.

8. The method of claim 7, wherein the binder comprises between 2% and 4% of zinc diethyldithiocarbamate by weight.

* * * * *